May 26, 1942.  G. H. HUFFERD ET AL  2,284,427
ROLLER CONSTRUCTION
Original Filed Sept. 9, 1940
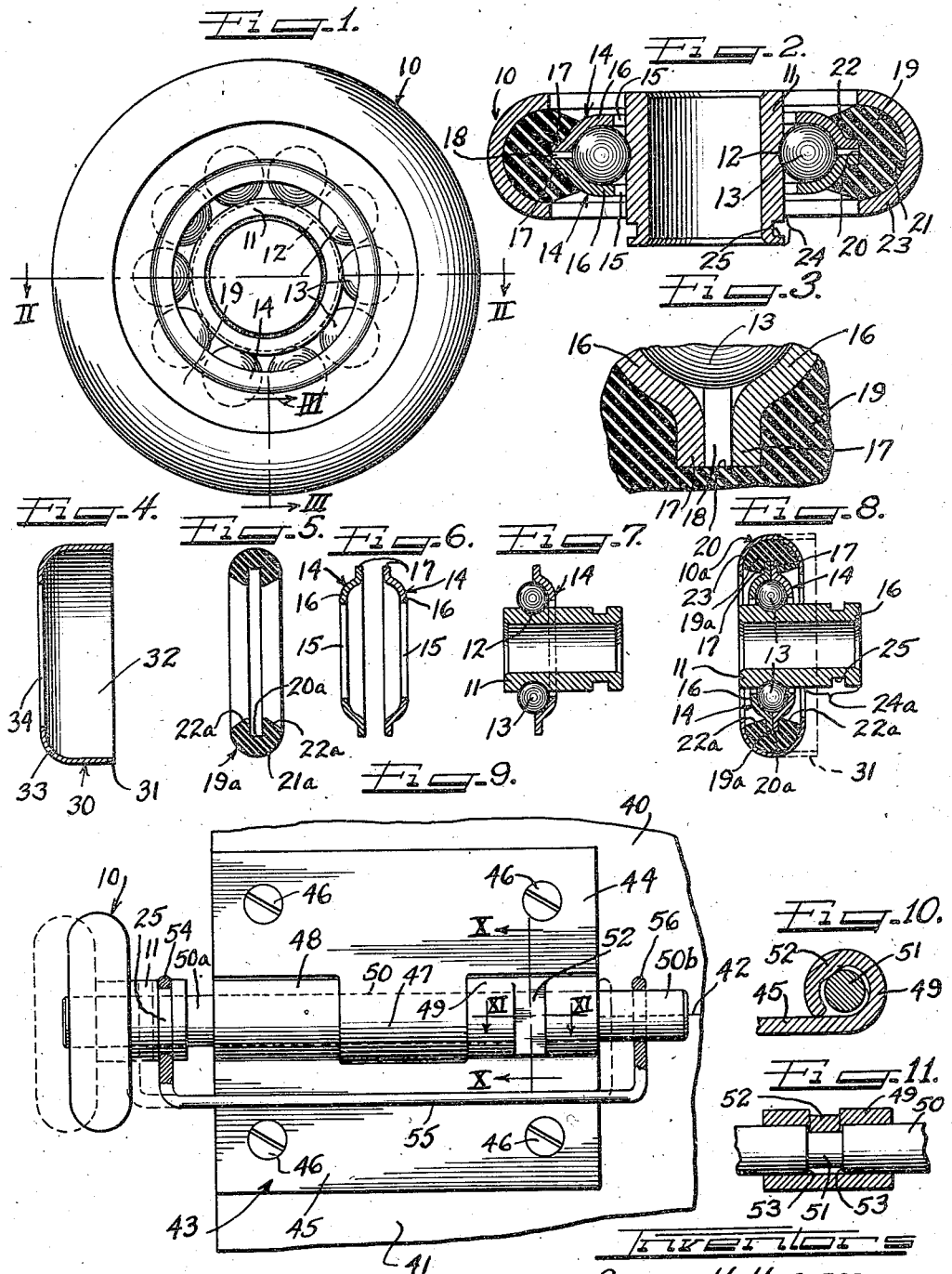
Inventors
GEORGE H. HUFFERD.
MATTHEW P. GRAHAM.

Patented May 26, 1942

2,284,427

UNITED STATES PATENT OFFICE 2,284,427

ROLLER CONSTRUCTION

George H. Hufferd and Matthew P. Graham, Detroit, Mich., assignors to Crawford Door Company, Detroit, Mich., a corporation of Michigan Original application September 9, 1940, Serial No. 355,906. Divided and this application March 8, 1941, Serial No. 382,312

6 Claims. (Cl. 16—107)

This invention relates to a roller construction especially adapted for use in upward acting garage doors.

More particularly, this invention relates to ball bearing rollers or wheels having resilient body portions and metal tires which cooperate to automatically take up wear of the metal bearing surfaces.

This application is a division of our copending application Serial No. 355,906, filed September 9, 1940, now matured into Patent No. 2,266,042, issued December 16, 1941.

While the invention will hereinafter be specifically described in connection with upward acting garage doors of the sectional type, it should be understood that the rollers of this invention can be used wherever ball bearing wheels or flexible ball bearing roller constructions are desirable.

According to this invention a hub member is provided with a circumferential groove to form an inner race ring for a row of ball bearings. A pair of opposed metal rings house the ball bearings and provide an outer race ring. A resilient body member of rubber or other resilient material partially envelops the metal rings housing the ball bearings to hold the same in assembled position. A metal tire surrounds the rubber body member to provide a tread for the roller. The metal tire preferably has a segmental circular cross section to envelop the sides of the rubber body member, thereby partially encasing the rubber and pressing the same to insure the automatic wear take up of the outer race ring parts.

The rollers of this invention are readily assembled from inexpensive constituent parts and the hub members preferably have an additional circumferential groove to cooperate with a retainer for holding the hub on the pintle of a hinge while at the same time permitting limited longitudinal shifting of the hub on the pintle.

It is, then, an object of this invention to provide a roller construction having a metal hub and a metal tread member separated by a flexible body member.

A specific object of the invention is to provide a wheel or roller construction with anti-friction elements between the tread and hub automatically held in proper bearing position by a resilient body portion.

Another object of the invention is to provide a roller having a metal tire or tread encasing a rubber body member to flexibly hold outer race ring parts.

A further specific object of the invention is to provide a wheel or roller construction including a row of ball bearings disposed around the hub of the wheel and housed in a flexibly mounted outer race ring.

A general object of the invention is to provide rollers or wheels that can be quickly assembled from inexpensive parts to provide independent units adapted to flex between their treads and hubs.

Other and further objects of the invention will be obvious from the following description of the annexed sheet of drawings which, by way of example, illustrates preferred embodiments of the invention.

On the drawing:

Figure 1 is a side elevational view of one form of a wheel or roller according to this invention.

Figure 2 is a horizontal cross-sectional view, with parts in elevation, taken along the line II—II of Figure 1.

Figure 3 is an enlarged fragmentary vertical cross-sectional view taken along the line III—III of Figure 1.

Figure 4 is a vertical cross-sectional view taken through a metal cup member used to form the tire or tread of rollers according to this invention.

Figure 5 is a vertical cross-sectional view of a rubber bushing used to form the body part of a modified form of roller according to this invention.

Figure 6 is a vertical cross-sectional view taken through a pair of mated stamped sheet metal members used to provide an outer race ring for the rollers of this invention.

Figure 7 is a vertical cross-sectional view, with parts in elevation, showing the assembly of a row of balls in one of the members shown in Figure 6 disposed around a hub of the rollers of this invention.

Figure 8 is a vertical cross-sectional view taken through a modified form of roller built up from the parts illustrated in Figures 4 to 7 and showing in dotted lines the manner in which the tire cup of Figure 4 is bent around the bushing of Figure 5 to complete the tire and encase the bushing.

Figure 9 is a plan view of a hinge construction having a roller of this invention mounted thereon and illustrating a retainer member for the roller partially in vertical cross-section.

Figure 10 is a cross-sectional view taken along the line X—X of Figure 9.

Figure 11 is a vertical cross-sectional view taken along the line XI—XI of Figure 9.

As shown on the drawing:

In Figures 1 and 2 the reference numeral 10 designates generally one form of roller according to this invention. The roller 10 is composed of a cylindrical metal hub 11 having a circumferential groove 12 therearound receiving a row of balls 13.

A pair of mating stamped metal disks 14 are centrally apertured as at 15. The apertures 15 are larger than the external diameter of the hub 11 so that the disks 14 will be in spaced relation from the hub. Each member 14 has a dished side wall 16 of segmental spherical contour extending from the aperture 15 to an outturned flat flange or rim 17.

The members 14 can be readily stamped from sheet metal by a simple stamping and punching operation which cuts circular disks from the sheet, holds the rims of the disks, cuts out the apertures 15 and presses the side walls 16 into the dished shape.

The metal members 14 are disposed in opposed relation around the row of balls 13 and form a housing or outer race ring for the balls. The side walls 16 of the members 14 are sized so that when they bear against the balls 13, the flanges or rims 17 will be in spaced opposed relation with a gap 18 therebetween, as best shown in Figure 3.

A ring 19 of rubber or other resilient material is molded with an internal groove 20, a semi-cylindrical outer periphery 21, and curved or dished inner walls 22 on each side of the groove 20. The rubber ring 19 is disposed over the members 14 with the flange 17 of the members seated in the groove 20 of the ring.

The rubber ring 19 forms the body part of the roller.

A metal tire or tread member 23 is disposed around the semi-circular periphery 21 of the ring 19 and houses the ring. The tire 23 is held by the ring 19 in spaced relation from the hub 11 and the ring 19 only partially covers the members 14 as best shown in Figure 2.

The tire 23, by virtue of its semi-circular cross-section, urges the rubber inwardly to close the groove 20 thereby maintaining the members 14 in proper bearing relation with the row of balls 13. This action constantly tends to close the gap 18 between the flanges 17 of the outer race ring part and provides an effective automatic wear take-up to compensate for wear developed during movement of the anti-friction elements on their metal bearing surfaces.

The ring 19 can, if desired, be formed from a cylindrical rubber tube or sleeve deformed by the tire 23 into the desired shape for exerting a pressure tending to close the gap 18 between the race ring parts.

The hub 11 is preferably longer than the width of the tire 23 and the groove 12 in the hub is formed closer to one end than to the other for holding the hub 11 substantially flush with one edge of the tire and for projecting the hub as at 24 beyond the other face of the tire. The projecting portion 24 has a circumferential groove 25 cut therein for a purpose to be hereinafter described.

The rubber ring 19 provides a resilient body member between the metal tire 23 and the hub 11 permitting flexing of the tire relative to the hub so that the roller 10 can be deformed upon application of side forces on the tire without stressing the metal parts or causing a binding action on the anti-friction rollers. For example, if the tire 23 rides in the track of an upward acting door and this track is misaligned with the door, the tire can maintain full contact with the track in a distorted position without binding the anti-friction elements or causing excessive wear on the door mounting for the hub 11. The rubber ring 19 thus affords a flexible body for the roller construction and, in addition, provides an automatic wear take-up on the bearing parts.

The roller 10a illustrated in Figure 8 differs from the roller 10 illustrated in Figures 1 and 2 in that the rubber body member 19a does not provide an automatic wear take-up for the race ring members 14. In this modification the rubber ring 19 holds the flanges 17 of the members 14 in contacting engagement. The ring 19a has a somewhat narrower groove 20a than the groove 20 and, in addition, has inner walls 22a on each side of the groove in spaced relation from the curved side walls 16 of the ring parts.

The balls 13 in the roller 10a can be smaller than the balls in the roller 10 so as to permit full contacting relation between the flanges 17 of the members 14 or the curved side walls 16 of the members can be sized to fit around balls of the same diameter as in the roller 10 while, at the same time, permitting engagement between their flanges 17.

The hub 11 of the roller 10a can have one end thereof flush with one side of the tire 23 as in Figures 1 and 2 while the other end can project from the other face of the tire for a distance 24a substantially greater than the distance 24 illustrated in Figure 2.

The rollers of this invention are readily assembled as indicated in Figures 4 to 7 which illustrate the assembly of the roller 10a.

In Figure 4 a stamped metal cup member 30 has a flat cylindrical side wall 31 defining an opening 32 large enough to slip the member 30 over the rubber ring 19a. The side wall 31 is inturned as at 33 to provide a curved end wall having the contour of the external periphery of the bearing ring 19a and providing a reduced opening 34 materially smaller than the diameter of the ring 19a.

The ring 19a is molded as shown in Figure 5 to provide the internal groove 20a, the internal side walls 22a and the external wall 21a of semi-cylindrical cross section.

The race ring parts 14 shown in Figure 6 are stamped from sheet metal as described above.

One of the members 14 is slipped over the hub 11 as shown in Figure 7, a row of balls 13 is mounted in the member 14, and the member 14 is positioned so that the balls will be seated in the groove 12 of the hub. The other member 14 is then disposed around the balls to house the same, the rubber ring 19a is then stretched so as to seat the flanges 17 of the members 14 in the groove 20a thereof, and the cup member 30 is slipped over the rubber ring as illustrated in Figure 8. The flat cylindrical wall 31 of the member 30 is next die-pressed inwardly to complete the tire 23 so that it will have a semi-circular cross section as illustrated in Figure 8.

The roller shown in Figures 1 and 2 is made from identical parts with the rubber ring 19 shaped slightly differently from the ring 19a.

The roller 10a shown in Figure 8 has all of the advantages of the roller 10 shown in Figures 1 and 2 with the exception of the automatic wear take-up feature. However, in the roller 10a, the balls 13 can have a freer rolling action in the outer race ring parts.

In Figure 9 the reference numerals 40 and 41 designate adjoining panels or sections of a sectional type upward acting door. The panels 40 and 41 have their adjoining ends in abutting relation as at 42, but are hingedly connected by means of a hinge 43 so that the door panels can articulate relative to each other as the door moves from vertical closed position to horizontal overhead open position.

The hinge 43 comprises a plate or leaf 44 secured to the door panel 40 and a leaf 45 secured to the door panel 41 by means of screws 46 passing through apertures in the respective leaves and threaded through the inner faces of the door panels as shown.

The leaf 44 has a dependent knuckle 47 in overlapping relation to the panel 41.

The leaf 45 has a pair of dependent knuckles 48 and 49 straddling the knuckle 47 as shown and overlapping the door panel 40. The knuckles 47, 48 and 49 provide aligned cylindrical journals for a hinge pintle 50 which swivelly connects the leaves 44 and 45.

The pintle 50 extends beyond the sides of the leaves 44 and 45 as at 50a and 50b.

As best shown in Figures 10 and 11, the pintle 50 has a localized reduced diameter portion 51 intermediate its ends seated in the knuckle 49. A portion of the knuckle 49 is cut and depressed to provide a kerf 52 abutting the shoulders 53 formed at the ends of the reduced portion 51.

In assembling the hinge leaves 44 and 45 the pin 50 is inserted through the knuckles 47, 48 and 49 and the kerf 52 of the knuckle 49 is then depressed into the reduced portion 51 of the pin for preventing longitudinal movement of the pin.

The end portion 50a of the pin projects beyond the side edges of the panels 40 and 41 as shown and slidably receives the hub 11 of a roller 10 or 10a shown in Figures 1 to 8. The hub 11 has an easy fit on the end 50a of the pin so that it can slide on the pin.

The grooved portion 25 of the hub is disposed between the tread of the roller and the side edges of the panels 40 and 41 and receives an eye end 54 of a stiff wire 55. The wire 55 extends across the inner face of the hinge 43 and has another eye end 56 loosely disposed around the projecting portion 50b of the pin 50.

The eye ends 54 and 56 are spaced apart for a distance greater than the length of the hinge 43 and are bent at right angles to the main body of the wire 55. Thus the bulb 11 can slide on the projecting end 50a of the pin 50 away from the door panels 40 and 41 until the eye 56 abuts the outer edge of the knuckle 49 as shown in dotted lines. This wire mounting 55 thus provides a shiftable retainer for holding the hub 11 on the end portion 50a of the pin 50 while at the same time permitting limited sliding movement of the hub on the pin. This movement is arrested before the hub can slide off of the end portion 50a.

The rollers of this invention are readily mounted on the hinge and held in shiftable relation thereon by an inexpensive wire retaining means which is readily snapped onto the projecting ends of the pintle pins.

Of course the wire 55 could be replaced with any other type of forged or cast straddling member having eye ends with one end loosely fitted over the inner end portion of the pintle pin and with the other end thereof seated in the groove of the roller hub.

The rollers can thus slide toward and away from the edges of the door to follow the tracks even though the tracks have varying spaced relation with the door edges. The rollers, by virtue of their resilient body portions, can be deflected out of normal alignment with their supporting pins to have full riding engagement in the tracks even though the tracks are not fully aligned with the door edges.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A roller or wheel construction comprising a cylindrical hub, anti-friction elements rotatable around said hub, a pair of spaced opposed outer race rings housing said anti-friction elements, a single resilient body member urging said race rings together, and a metal tire encasing said resilient body member.

2. A roller construction comprising a hub, a pair of mated shells assembled on the hub and forming therewith a ball race, anti-friction elements between the hub and pair of mated shells holding said shells in spaced opposed relation, a one-piece resilient rubber ring encompassing said shells, and a metal tread surrounding said rubber ring whereby said shells will be urged together to automatically compensate for wear.

3. A hubbed roller construction with a rigid tread adapted to be resiliently misaligned from the hub comprising a tubular member, a pair of metal shells together forming an outer race ring, anti-friction elements disposed between the tubular member and the shells, said shells having peripheral flanges, a resilient rubber ring having an internal groove encompassing said shells and directly receiving said flanges in the groove thereof to urge the shells together, and a metal tread covering said rubber ring.

4. A roller construction comprising a tubular member providing an inner raceway for anti-friction elements, a pair of opposed mating shells providing an outer race ring for anti-friction elements, said shells having flat peripheral flanges, a resilient rubber ring having an internal groove directly receiving said flanges, to resiliently hold the mating shells in operative position, and an annular U-shaped tire encompassing said rubber ring.

5. A roller comprising a hub having a circumferential groove providing an inner race ring, a pair of spaced opposed mating shells surrounding said hub and providing an outer race ring, a row of ball bearings in said groove housed in said shells, and a resilient ring encompassing said shells to urge the same toward each other and provide a flexible body for the roller.

6. A roller construction comprising a circumferentially grooved cylindrical member providing an inner race ring, a pair of spaced opposed mating shells providing an outer race ring, said shells having outturned flanges, a row of ball bearings between the shells and member holding said flanges in spaced relation to provide a gap therebetween, and an internally grooved resilient roller body member directly receiving said flanges in the groove thereof and urging the same together for decreasing said gap therebetween to compensate for wear on the metal bearing parts.

GEORGE H. HUFFERD.
MATTHEW P. GRAHAM.